Figure 1:
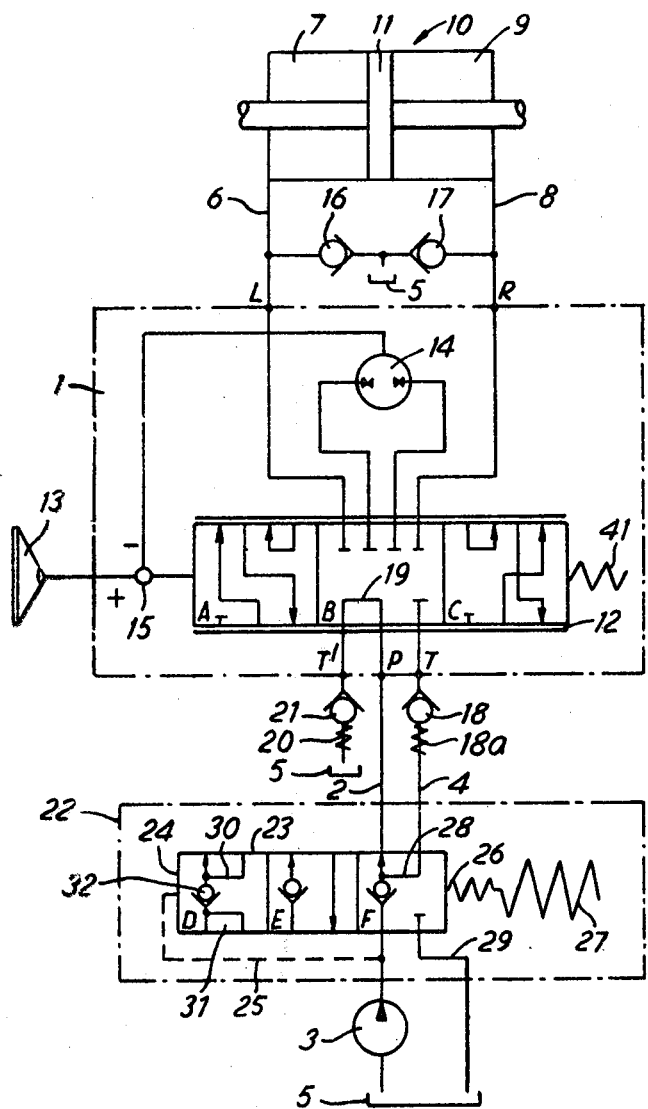

United States Patent [19]

Thomsen et al.

[11] 4,412,415
[45] Nov. 1, 1983

[54] HYDROSTATIC STEERING GEAR

[75] Inventors: Svend E. Thomsen, Nordborg; Erik Kyster, Augustenborg, both of Denmark

[73] Assignee: Danfoss A/S, Nordborg, Denmark

[21] Appl. No.: 234,778

[22] Filed: Feb. 17, 1981

[30] Foreign Application Priority Data

Feb. 21, 1980 [DE] Fed. Rep. of Germany ....... 3006509

[51] Int. Cl.³ .......................... F15B 7/00; B62D 5/08
[52] U.S. Cl. ......................................... 60/384; 91/449
[58] Field of Search ........................ 91/449; 60/384; 418/61 B

[56] References Cited

U.S. PATENT DOCUMENTS 3,363,514 1/1968 Ramcke ............................ 91/449 X
3,635,020 1/1972 Mahlmann ........................ 91/449 X
4,050,474 9/1977 Morgan ............................. 418/61 B Primary Examiner—Arnold Rosenthal
Attorney, Agent, or Firm—Wayne B. Easton

[57] ABSTRACT

The invention relates to a hydraulic steering system of the type having a servomotor controlled by a steerable valve assembly which directs metered quantities of pressurized fluid to the servomotor and has a feedback arrangement for stopping the flow of fluid when the steering motion is stopped. The system involves an arrangement wherein the metering unit is arranged downstream from the servomotor and an auxiliary valve is provided for automatically accommodating normal conditions as well as emergency pump failure conditions and overpressure conditions caused by the servomotor reaching an extreme end position in the operation thereof.

7 Claims, 3 Drawing Figures

HYDROSTATIC STEERING GEAR

The invention relates to a hydrostatic steering gear with a direction-dependent servomotor and a control device provided with connections for a pump, a tank, and the servomotor, as well as with a valve assembly determining the amount and direction of flow, which can be moved by a steering element and returned by a measuring motor, where the single motor serves as an emergency pump driven by the steering element in case of a pump failure.

In a known steering gear of this type (Germ. Pat. No. 12 93 029) the valve assembly has concentric valve sleeves, one of which is connected with a steering handwheel and the other with the rotor of the measuring motor. The neutral position of the two valve sleeves is determined by neutral position-springs. When the steering handwheel is turned, current paths, which lead from the pump to the servomotor and from the servomotor to the tank, are opened after a small relative movement. When the measuring motor preforms no resetting movement, because the pump has failed or because the servomotor has not reached its end stop, the steering element and the rotor of the measuring motor are coupled with each other after a given lost motion. This leads in a pump failure to an emergency pump operation and to a corresponding resistance on the steering handwheel when the end position is reached. But these operating methods are only possible because a switching device is provided which switches the measuring motor to the respective intake-input side of the servomotor (meter-in operation).

It is also known to apply the measuring motor at least temporarily to the outside of the measuring motor (meter-out operation), either because the amount of flow is also to be measured on the output side (U.S. Pat. No. 3,348,493) or because the measuring motor is not to be switched (proposal according to patent application No. P 29 44 883). In these cases, emergency pump operation or end position transmission to the steering element is only possible when a part of the measuring motor or a second measuring motor is provided at the input side of the servomotor. This requires considerable additional costs.

The object of the invention is to provide a hydrostatic steering gear of the above-described type, where a single measuring motor is completely connected, at least temporarily, for meter-out operation, while emergency pump operation and/or end position transmission to the steering element is still possible.

This problem is solved according to the invention in this way that the measuring motor is arranged downstream of the servomotor, at least in one direction of operation of the latter and that an auxiliary valve actuated in dependence on the pump action is provided, which connects in a normal position the pump connection with the pump and the tank connection with the tank, and which switches in a pump failure and/or in a rise of the pump pressure above a given limiting value to an emergency operation or overpressure position in which it connects the tank connection, on the one hand, with the pump connection, and separates it, on the other hand, from the tank.

In this design, the output side of the measuring motor connected in meter-out operation is disconnected from the tank in certain operating situations. The idling measuring motor can not be carried along by the steering element, because liquid is delivered practically pressureless into the tank. At the same time, the output side of the measuring motor is connected with the pump connection of the control device. This means in a pump failure that the measuring motor is now connected as an emergency pump in a closed cycle between the two working chambers of the servomotor. When the servomotor has reached its end position and the pump pressure thus rises, this means that this pump pressure also acts on the output side of the measuring motor and encounters therefore considerable resistance in a positive coupling between steering element and measuring motor, which indicates the end position. The switching of the auxiliary valve can therefore be easily derived from the states of the pump, particularly the pump pressure itself.

For switching into the emergency position, it is advisable if the auxiliary valve can be moved by a weakly prestressed spring into the emergency operating position by the oppositely acting pump pressure into the overpressure position.

For switching into the overpressure position, it is advisable if the auxiliary valve is moved by a highly prestressed spring into the normal position and by the oppositely acting pressure into the overpressure position.

In a preferred embodiment, the emergency operating position is provided on one side and the overpressure position on the other side of the normal position, and only the weakly prestressed reference spring acts during a first displacement path. All three operating states are thus realized by a single auxiliary valve, which is controlled merely in dependence on the pump pressure.

In a preferred embodiment, a spring-loaded check valve is connected into the line between the tank connection and the tank, which opens toward the tank, and whose spring is so dimensioned that the pressure drop appearing thereon is greater than the force of the neutral position-spring of this valve assembly necessary for moving the valve assembly from the neutral position into an operating position. This check valve makes sure that the measuring motor is not already entrained as a pump in normal operation, when the valve assembly is displaced by the actuator and the measuring motor is to follow later.

Furthermore it is of advantage if the valve assembly of the control device has in its neutral position a short circuit connection between pump connection and a neutral position-tank connection which is connected with the tank, bypassing the auxiliary valve, and which has a spring-loaded check valve opening toward the tank, whose spring is so dimensioned that the pressure drop occurring thereon is greater than the pump pressure required to move the auxiliary valve from the emergency operating position into the normal position. Here too, the check valve ensures an adequate minimum pressure to keep the auxiliary valve in the first position even when the valve assembly of the control device assumes its neutral position. The separate neutral position-tank connection is provided so that the pump can easily accelerate.

Preferably the auxiliary valve is associated with a check valve closing toward the pump. The latter ensures a tight seal of the working cycle of the emergency pump when the auxiliary valve assumed the emergency operating position.

When using a measuring motor fixedly associated with a servo-motor connection, it is advisable to connect this connection and the pump connection with the tank over a suction-check valve closing toward the tank. This ensures independent of the direction of rotation of the steering element in emergency control operation, that the emergency pump can take in sufficient liquid.

For the same reason it is advisable, when using a direction-dependent measuring motor associated with one of the two servomotor connections, to connect these two connections with the tank over a suction-check valve closing toward the tank.

It is also of advantage if the pump is connected with the tank in the overpressure position. The auxiliary valve acts then at the same time as an overflow valve, which limits the pressure rise in the pump.

In the overpressure position, the connection between the pump and the tank can be provided in front of, and the connection between tank connection and pump connection behind the check valve closing toward the pump. The full pump pressure can then act on one side of the measuring motor over the check valve. Inversely, pressure increases in the cycle containing the measuring motor are not reduced toward the tank.

The invention will be described below with reference to the drawing showing preferred embodiments.

Figure 2:
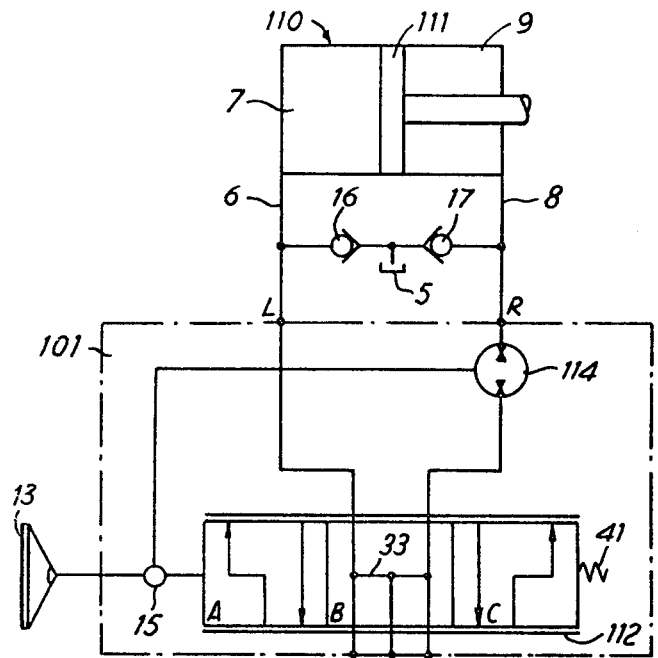
Figure 3:
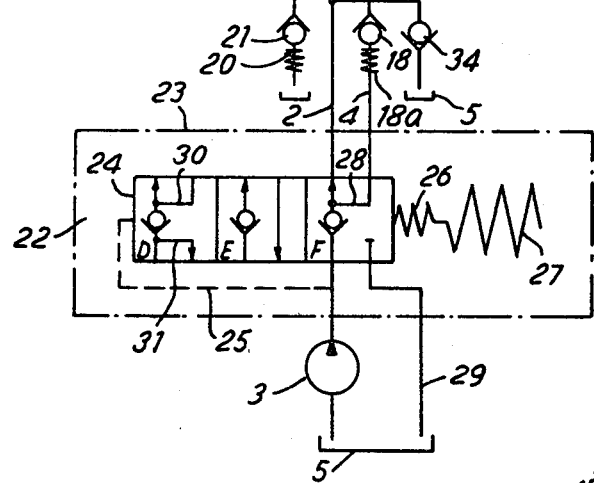
Figure 3:
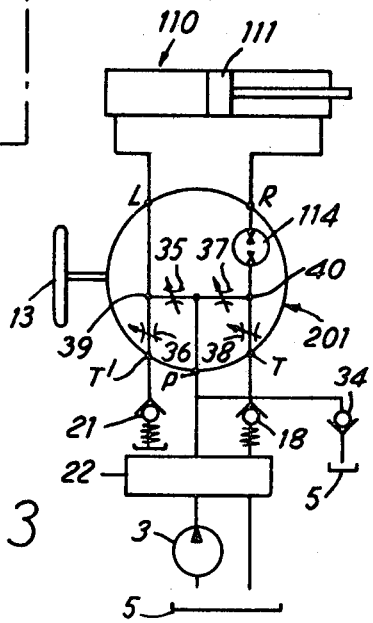

FIG. 1 shows a circuit diagram for a hydrostatic steering unit with switchable measuring motor FIG. 2 shows a circuit diagram of a hydrostatic steering unit with a measuring motor fixedly associated with a servomotor connection, and FIG. 3 shows a variant of FIG. 2 in a schematic representation.

A control device 1 has a pump connection P which is connected over a pump line 2 to a motor-driven pump 3, a tank connection T which can be connected over a tank line 4 to a tank 5, and two servomotor connections L and R, of which connection L is connected over a working line 6 to a working chamber 7, and connection R is connected over a working line 8 to a working chamber 9 of a servomotor 10, whose piston 11 actuates the wheels to be steered. Furthermore control device 1 has a valve assembly 12 with three positions, namely a neutral position B, a position A for counterclockwise rotation, and a position 6 for clockwise rotation. A steering element 13 moves valve assembly into one or the other direction. A measuring motor 14 performs a restoring function, as it is indicated by a comparator 15. Measuring motor 14 is reversible, so that it always follows the output side of servomotor 10 in positions A and C of valve assembly 12. Steering element 13 is in known manner fixedly connected with the rotor of measuring motor 14, when a given lost motion is exceeded in comparator 15 against the force of a neutral position-spring 41.

Servomotor connections L and R are each connected to tank 5 over a check valve 16, 17 closing toward the tank. Into tank line 4 is connected a check valve 18 loaded by a spring 18, which opens toward tank 5. In neutral position, valve assembly 12 has a short circuit connection 19 which leads to a neutral position-tank connection T', which is connected to tank 5 over a check valve 21 loaded by spring 20 and opening toward the tank.

An auxiliary valve 22 has a valve slide 23 which can assume three positions D, E and F, namely an overpressure position D, a normal position E, and an emergency operating position F. On one side is provided a pressure chamber 24 into which pressure is supplied from the output of pump 3 over a control line 25. On the other side, act a weakly prestressed reference spring 26 and a highly prestressed reference spring 27. The weak reference spring 26 is compressed when the pump pressure exceeds a first given limiting valve, so that the auxiliary valve is moved from emergency operating position F, into normal position E. When the pump pressure increases, reference spring 27 is compressed so that the auxiliary valve moves from the normal position into overpressure position D. Reference spring 26 is so prestressed that the pump pressure required to open one of the check valves 18 to 21 suffices to bring the auxiliary valve into the normal position E. In emergency operating position F, tank line 4 is connected over a section 28 of pump line 2, while it is separated from line section 29 leading to tank 5. In normal position E, pump 3 is connected directly with pump line 2, and tank line 4 directly with line section 29. In overpressure position D, tank line 4 is connected over a connecting path 30 with pump line 2, and pump 3 over a connecting path 31 with line section 29. In all these cases, a check valve 32 closing toward the pump is provided.

The mode of operation is as follows:

In normal position E of auxiliary valve 22, pump 3 delivers pressure fluid over pump line 2, short circuit connection 19, and check valve 21 to tank 5. Due to the check valve, a pump pressure is built up which suffices to overcome reference spring 26 and to maintain normal position E. When steering element 13 is turned, e.g. so that valve assembly 12 moves to the right into position A, pressure fluid is conducted over the valve assembly and working line 6 to working chamber 7 of servomotor 10, while fluid returns from working chamber 9 over working line 8, measuring motor 14, tank line 4, auxiliary valve 22 and line section 29 to tank 5. Measuring motor 14 performs here a restoring function. Piston 11 of servomotor 10 moves to the right. When steering element 13 is turned in the opposite direction, position C of valve assembly 12 is effective, and servo-motor piston 11 moves to the left. Here too, however, measuring motor 14 is connected to the output side of the servomotor.

If pump 3 fails, the pump pressure drops to zero, and reference spring 26 urges auxiliary valve into emergency operating position F. If steering element 13 is now turned, for example, in the direction of position A, the rotor of measuring motor 14 is entrained after a given lost motion. It therefore works as an emergency pump, which takes in fluid from working chamber 9 and delivers it under pressure over tank line 4, connecting path 28, pump line 2 and working line 6 to working chamber 7 of servomotor 10. Accordingly, this position moves to the right. When steering element 13 is turned in the opposite direction, the conditions are similar, and piston 11 moves to the left.

When an end position is reached in the normal operating position E of piston 11, the pump pressure rises, because of the increased resistance in the working cycle. Auxiliary valve 22 therefore moves into overpressure position D. This has the result, on the one hand, that an overflow path through connection path 31 is opened, which prevents a further increase of the pump pressure. On the other hand, the pump pressure is applied to measuring motor 14 over tank line 4. If one therefore tries to turn steering element 13 further, despite the fact that the end piston of the servomotor piston has been reached, this is no longer possible or only with great difficulties after the lost motion, because the rotor of measuring motor 14 would have to work against the pump pressure. The operator knows therefore that the end position has been reached. This function exists in both directions of rotation. When valve assembly 12 assumed its neutral position B, pump 3 can deliver pressure fluid over check valve 21. The pump pressure thus drops, so that auxiliary valve 22 returns into normal position E.

In the embodiment according to FIG. 2, the same reference numbers have been used for identical parts, and reference numbers increased by 100 for corresponding parts. Different is here substantially that control device 101 has a measuring motor 114 which is fixedly associated with servomotor connection R. Consequently valve assembly 112 has a simpler design, since measuring motor 114 no longer has to be switched. Besides, both working lines 6 and 8 are connected with each other and with the pump over a connecting path 33. Because of the fixed installation of measuring motor 114, another suction-check valve 34 is provided which closes toward tank 5 and is connected with pump line 2.

The normal operation is similar as in FIG. 1. But measuring motor 114 is in position A of valve assembly 12 behind servomotor 10 and in position C in front of the servomotor. If pump 3 fails, hence in the emergency operating position F of auxiliary valve 22, measuring motor 114 can act as an emergency pump because its pressure side is separated from tank 5. In one direction, fluid is sucked in from working chamber 7 and through suction valve and delivered to working chamber 9. In the other direction, fluid is sucked in from working chamber 9 over suction valve 17 and delivered to working chamber 7, the working cycle running through connecting path 28 in auxiliary valve 22.

The overpressure position D of auxiliary valve 22 is only necessary for the right-hand end position of piston 11, because in the left-hand end position, position 11 forms itself an abutment for the rotation of measuring motor 114.

In the embodiment according to FIG. 3, a slightly modified control device 201 is used, compared to FIG. 2. Here two series connections of chokes 35, 36 and 37, 38 resp. are arranged between pump connection P and tank connection T and T' resp. Connecting point 39 of the first series connection is connected to servomotor connection L, connecting point 40 to servomotor connection R. In neutral position B, chokes 35 to 38 have the same choke resistance. In a displacement, chokes 35 and 38 change in one direction, and chokes 36 and 37 in the opposite direction, so that in the end position of position A chokes 35 and 38 are completely open and chokes 36 and 37 are completely closed. The opposite is true in the end position of postion C. Such a control device 201 has the advantage that even the slightest movement of steering element 13 leads to a shift of servomotor 110. This results in a very high reaction velocity. But it is necessary that measuring motor 114 is stationary. By means of auxiliary valve 22 it is possible here too to achieve the same conditions in emergency operation and at overpressure as in the preceding examples.

What is claimed is:

1. A hydraulic steering control system comprising a bidirectional servomotor having two operating ports on opposite sides thereof, pump and tank means, a valve assembly including a metering unit, said valve assembly having a steering wheel connection and being connected to said servomotor and said pump and tank means, said valve assembly being operable to form fluid supply and exhaust branches for selectively feeding and exhausting opposite sides of said servomotor, said metering unit being in at least one of said exhaust branches, auxiliary valve means between said pump and tank means on one side thereof, said auxiliary valve means having a normal operating position assumable upon being subjected to pump pressure to connect said fluid supply and exhaust branches to said pump and tank means, said auxiliary valve means having an emergency operating position assumable in the absence of pump pressure to connect said fluid supply and exhaust branches to permit fluid flow in said branches responsive to the manual actuation of said valve assembly.

2. A hydraulic steering control system according to claim 1 wherein said metering unit is common to both of said exhaust branches.

3. A hydraulic steering control system according to claim 1 wherein said metering unit is in at least one of said exhaust branches.

4. A hydraulic steering system according to claim 3 wherein said metering control unit is fixedly connected to one of said servomotor operating ports.

5. A hydraulic steering control system according to claim 4 wherein said valve assembly has a pump connection and two tank connections connected respectively to one of said servomotor operating ports and to said metering unit, and two series connections of throttle chokes disposed between said pump connection and said pump connection and said tank connections to increase reaction velocities and thereby the sensitivity of said servomotor to steering operations.

6. A hydraulic steering control system comprising a bidirectional servomotor having two operating ports on opposite sides thereof, pump and tank means, a valve assembly including a metering unit, said valve assembly having a steering wheel connection and being connected to said servomotor and said pump and tank means, said valve assembly being operable to form fluid supply and exhaust branches for selectively feeding and exhausting opposite sides of said servomotor, said metering unit being in at least one of said exhaust branches, said auxiliary valve means having weak and strong springs in series with said weak spring being displaceable for a normal operating position, said auxiliary valve means having an overpressure position assumable when said servomotor reaches an extreme end condition and a pressure is generated which displaces both of said springs to accommodate said overpressure position.

7. A hydraulic steering control system according to claim 6 including one way valve means between said auxiliary valve means and said valve assembly exhaust branch, said one way valve means being closeable in the direction of said valve assembly exhaust branch, said overpressure position having passage means associated therewith for applying pump pressure to said one way valve means to resist further movement of said servomotor.

* * * * *